US012792759B2

(12) United States Patent
Mytton et al.

(10) Patent No.: US 12,792,759 B2
(45) Date of Patent: Nov. 10, 2026

(54) SYSTEMS AND METHODS FOR APPLICATION-INTEGRATED SECURITY

(71) Applicant: Arcjet Labs, Inc., San Francisco, CA (US)

(72) Inventors: David Mytton, London (GB); Blaine Aden Bublitz, Phoneix, AZ (US)

(73) Assignee: Arcjet Labs, Inc., San Francisco, CA (US)

(*) Notice: Subject to any disclaimer, the term of this patent is extended or adjusted under 35 U.S.C. 154(b) by 88 days.

(21) Appl. No.: 18/941,377

(22) Filed: Nov. 8, 2024

(65) Prior Publication Data

US 2026/0134126 A1 May 14, 2026

(51) Int. Cl.
*G06F 21/62* (2013.01)
*G06F 21/55* (2013.01)

(52) U.S. Cl.
CPC .......... *G06F 21/6218* (2013.01); *G06F 21/55* (2013.01)

(58) Field of Classification Search
None
See application file for complete search history.

(56) References Cited

U.S. PATENT DOCUMENTS

| | | | | |
|---|---|---|---|---|
| 11,100,218 | B2 * | 8/2021 | Anand | G06F 21/54 |
| 11,163,874 | B2 * | 11/2021 | Demsey | G06Q 30/0277 |
| 11,568,042 | B2 * | 1/2023 | Crabtree | G06F 21/53 |
| 2007/0226773 | A1 * | 9/2007 | Pouliot | G06F 21/53 726/1 |
| 2011/0179483 | A1 * | 7/2011 | Paterson | G06F 21/53 709/219 |
| 2015/0052607 | A1 * | 2/2015 | Al Hamami | G06F 21/552 726/23 |
| 2017/0104756 | A1 * | 4/2017 | Rosenthal | H04L 63/20 |
| 2020/0026850 | A1 * | 1/2020 | Levin | H04L 63/20 |
| 2022/0027456 | A1 * | 1/2022 | Hulick, Jr. | H04L 63/1433 |
| 2022/0188444 | A1 * | 6/2022 | Stoler | H04L 9/006 |
| 2022/0318350 | A1 * | 10/2022 | Hulick, Jr. | G06F 21/52 |
| 2024/0095370 | A1 * | 3/2024 | Hulick, Jr. | G06F 21/577 |
| 2024/0320321 | A1 * | 9/2024 | Larusson | G06F 21/53 |
| 2024/0333501 | A1 * | 10/2024 | Durham | G06F 21/6218 |
| 2025/0039196 | A1 * | 1/2025 | Crabtree | G06F 21/6218 |
| 2026/0064829 | A1 * | 3/2026 | Ackerman | G06F 21/53 |

* cited by examiner

*Primary Examiner* — Rupal Dharia
*Assistant Examiner* — Shadi H Kobrosli
(74) *Attorney, Agent, or Firm* — Ansari Katiraei LLP; Arman Katiraei; Sadiq Ansari

(57) ABSTRACT

A security controller is provided to integrate within the code of an application and provide application-specific security from within the application. Specifically, the security controller enforces security rules and/or protections that are customized according to the context and/or code, functions, services, and/or operations of the application. The security controller intercepts a request that is directed to a function or service of the application before code associated with the function or service in the application executes. The security controller analyzes the request against application-specific security rules, resumes execution of the application code in response to the request not violating any of the application-specific security rules, and performs a protective action that is defined as part of an application-specific security rule in response to the request violating that application-specific security rule. Resuming execution of the application code includes invoking the function or service of the application with the request.

20 Claims, 11 Drawing Sheets

201

```
import arcjet, { validateEmail } from "@arcjet/node";
import express from "express";
```

203

```
const aj = arcjet({
  key: process.env.ARCJET_KEY!,
  rules: [
    validateEmail({
      // Will block requests. Use "DRY_RUN" to log only
      mode: "LIVE",
      // Blocks disposable, no MX records, and invalid emails
      block: ["DISPOSABLE", "NO_MX_RECORDS", "INVALID"],
    }),
  ],
});
```

205

```
const app = express();
const port = 3000;

// Handle a form submission
app.use(express.urlencoded({ extended: false }));

app.post("/", async (req, res) => {
  const decision = await aj.protect(req, {
    // Get the email from the form submission
    email: req.body.email,
  });

  if (decision.isDenied()) {
    res.writeHead(403, { "Content-Type": "application/json" });
    res.end(JSON.stringify({ error: "Forbidden" }));
  } else {
    ...);
  }
});

app.listen(port, () => {
  console.log("Example app listening on port 3000!");
});
```

FIG. 2

SYSTEMS AND METHODS FOR APPLICATION-INTEGRATED SECURITY

BACKGROUND

Security solutions that provide rate limiting, bot protection, and other network or system-based attacks are commonly implemented at a network point-of-entry. For instance, a Web Application Firewall (WAF) may be implemented at a router, load balancer, director, or other node that receives all inbound requests that are directed for any services or applications that are provided and/or accessible from a network node or a network destination. The WAF is a one-size-fits-all security solution that provides the same protections for each and every application or service that is available from that network node or network destination. As a result, the protections are generalized so that they apply to all applications, services, or a broad class of applications. In other words, the protections are not customized based on the code of each specific application or service being protected or for the context or operations of individual applications or services. Moreover, the protections are controlled, managed, and/or monitored by different individuals than those creating, managing, and/or monitoring the applications or services.

The generalized protections offered by the WAF open up or fail to adequately protect against certain vulnerability or attack vectors of the individual applications or services. The generalized protections also lead to high false positive rates and incorrect blocking of valid requests or legitimate users. The security administrators controlling the WAF often do not understand how the applications and services protected by the WAF work so the implemented protections may be error prone or ineffective. The disconnect between the security administrators and the application developers may also cause the applications or services to fail or become inaccessible when valid or certain traffic is blocked or restricted. The application developers may have to refactor their code if there is no direct line to the security administrators, the security administrators are slow to respond, or the security administrators cannot implement the desired changes to the protections because the changes may open other applications or services to attack. The security administrators typically roll out new or changed protections directly in the production environment without advising the application developers. Accordingly, the application developers are unable to test the protections against their applications or services during the build process or as part of automated testing. Moreover, the results of the WAF analysis and/or protections implemented by the WAF remain at the WAF. The results are not exposed to the protected applications or services in real time such that the application developers cannot customize the behavior, operation, or logic of their applications or services according to different potential threats or attacks.

BRIEF DESCRIPTION OF THE DRAWINGS

FIG. 2 illustrates an example of integrating a local security controller of the application-integrated security system in an application in accordance with some embodiments presented herein.

DETAILED DESCRIPTION OF PREFERRED EMBODIMENTS

Figure 1:
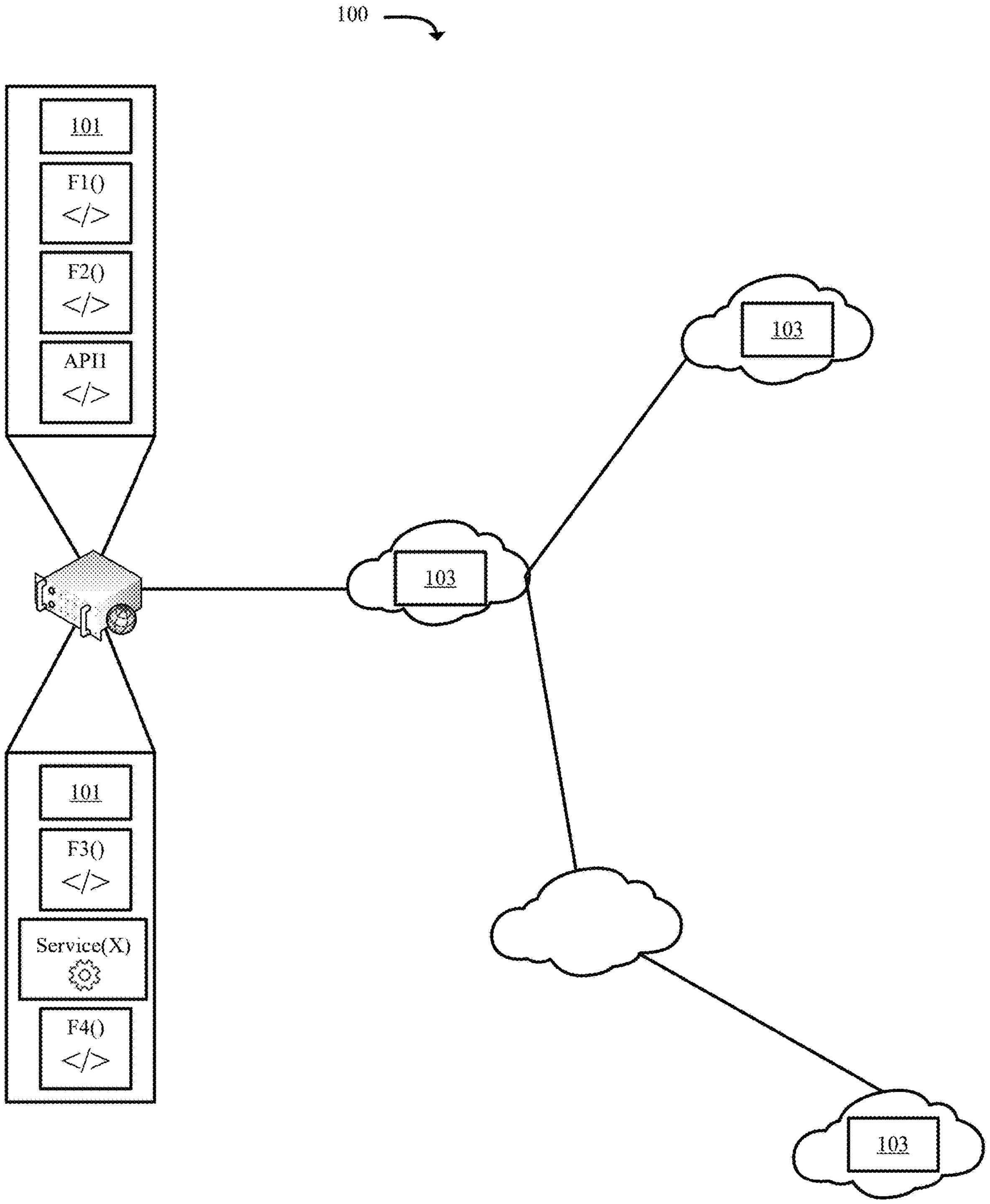
FIG. 1 illustrates an example architecture for the application-integrated security system in accordance with some embodiments presented herein.

The following detailed description refers to the accompanying drawings. The same reference numbers in different drawings may identify the same or similar elements.

Provided is a security system and associated methods for providing application-specific security from within the application. The security system includes a local security controller that is integrated and runs as part of the application native code.

The integration of the local security controller into the application allows for the security rules and/or protections of the security system to be customized according to the context and/or code, functions, services, and/or operations of the application. The integration further allows for the security system to run or execute with the native performance of the application.

In some embodiments, the execution of the local security controller in the code of the application includes intercepting requests that are directed to other functions or services of the application. The local security controller code may be placed before the code for the other functions and services of the application in order to intercept the requests and analyze the requests for threats, attacks, malicious content, and/or other verifications before calling or invoking the other functions or services. The local security controller is defined and/or configured with custom security rules that are specified for the application functions and services. The local security controller executes in a secure sandbox environment, and screens the intercepted requests against the custom security rules in the secure sandbox environment. The local security controller releases the request from the sandbox environment in response to determining that the request does not violate any of the custom security rules. The request may then proceed through the application and call or invoke any targeted application functions or services.

In response to detecting a threat, attack, or violation of a configured security rule, the local security controller may block, redact, or otherwise restrict the request from calling, invoking, or accessing a targeted function or service of the application. The local security controller may perform other protections including providing real-time analysis of each intercepted request in interfaces, reports, or logs that are generated while the application executes. Moreover, the results of the request screening may be integrated into the application logic such that violations of the same security rule in different applications may be handled differently, receive different protections, and/or produce different notifications in the different applications. In this manner, application developers are provided direct insight into how their applications respond to different requests and/or attacks. The application developers may implement changes to the application logic or code as the application is under threat or attack or as the results of the analysis are presented without having to wait for a security administrator to notify the application developer of an attack, the specifics of the attack, applications that may be attack targets, and/or other attack information that is not directly available to the application developer when security is provided by a Web Application Firewall (WAF) or other security solution that runs outside the application and/or that protects multiple applications running on the same or different devices or nodes as the security solution.

The security system includes a remote security controller for performing deeper and/or stateful analysis of requests in addition to or as a supplement to the security rules configured and enforced by the local security controller. The local security controller screens requests against the configured set of security rules from within the secure sandbox environment and asynchronously and/or in a non-blocking manner forwards the requests to the remote security controller for screening against different rules or attacks. If the requests are determined to be safe by not violating the configured set of security rules, the local security controller may also forward the requests to the called or invoked functions or services of the application for execution. In some embodiments, the local security controller screens the requests against the configured set of security rules and forwards the requests to the remote security controller for additional screening while blocking further operation of the application or calling of the application functions or services by the request until the additional screen by the remote security controller is complete and no security threats or attacks are detected by the local security controller and the remote security controller.

The remote security controller checks the forwarded requests for other attacks, and activates an attack protection on the local security controller in response to detecting one or more of the other attacks in one or more of the forwarded requests. The local security controller caches or registers the attack protection activated by the remote security controller with a corresponding attack signature. The local security controller enforces the attack protection activated by the remote security controller against any subsequent requests that the local security controller receives with the matching attack signature. The remote security controller expands the security protections that the security system offers to protect against more sophisticated attacks, such as brute force attacks, that may not be detected when running within the application code due to a distributed nature of the attack or the attack being a stateful attack.

FIG. 1 illustrates an example architecture for the application-integrated security system 100 in accordance with some embodiments presented herein. Application-integrated security system 100 includes local security controller 101 and distributed set of remote security controllers 103.

Local security controller 101 may be integrated to run as a first executing module, function, component, or service of an application and to protect other modules, functions, components, services, and/or Application Programming Interfaces (APIs) that are defined or accessed in the application code from various attacks. The attacks may be submitted or contained in requests that call or invoke the other modules, components, services, and/or APIs. An attack may correspond to an unauthorized or unexpected use of the modules, functions, components, services, and/or APIs, an attempt to disable or bring down the application, an attempt to misappropriate sensitive or confidential data from the application, an attempt to access data of others, an attempt to control the device running the application, an attempt to access the application by an unauthorized or restricted user or device (e.g., automated clients or bots of a botnet), and/or an attempt to spread malicious code to the application and/or other devices that access the application.

The application in which local security controller 101 runs may include an executable container, image, compiled binary, executable script, Just-In-Time (JIT) compiled code, and/or another program with code that may be executed on-demand. In some embodiments, security system 100 supports applications written in Bun, Next.js, Node.js, SvelteKit, Deno, Remix, Django, Ruby on Rails, Laravel, and other application frameworks or coding languages.

In some embodiments, local security controller 101 is a Software Development Kit (SDK) that may be integrated in the application code with one or more declarations, function calls, and/or definitions to load or run the SDK. In some such embodiments, local security controller 101 includes a WebAssembly module for creating a sandbox environment in which intercepted requests may be analyzed without access to other application code or access to memory or other resources that have been allocated to the application.

Different applications that run or are accessible from the same server, node, machine, or device may run their own instance of local security controller 101. Each instance of local security controller 101 is configurable to provide different security protections that are relevant for the context, usage scenario, and/or operations of that application. Local security controller 101 may be configured in the application code by setting parameters that are used to call or initiate execution of local security controller 101, by calling specific functions of local security controller 101, and/or by defining different security rules for local security controller to enforce.

FIG. 2 illustrates an example of integrating local security controller 101 in an application in accordance with some embodiments presented herein. FIG. 2 illustrates example code 201 for initializing local security controller 101 in an application defined using the Node.JS framework. After initializing the local security controller 101 instance in the application, code for the custom security validations performed by local security controller 101 may be defined. FIG. 2 includes example code 203 for defining an email validation rule for local security controller 101 to enforce against requests that access the application and/or call or invoke functions or services of the application. Example code 205 defines an API endpoint, analyzes requests or messages that are directed to functions or services of the application using the configured rules in example code 203 before those requests or messages call or invoke the targeted functions or services, provides information of a rule violation, executes protections in response to a rule violation, provides recommendations on the actions to be taken based on the results of the executed protections, and/or actions to take if no rule violation are detected.

With reference back to FIG. 1, distributed set of remote security controllers 103 include devices that are located at network points-of-presence (PoP) with different proximity to sets of the devices or nodes that run different instances of local security controller 101. In some embodiments, local security controller 101 may use Anycast to locate the closest remote security controller 103 (e.g., remote security controller 103 that is the fewest network hops from local security controller 101 or that has the lowest latency when exchanging messages with local security controller 101). In some other embodiments, local security controller 101 may perform a network discovery procedure to detect and connect to the closest remote security controller 103. Local security controller 101 may establish a persistent connection with the closest remote security controller 103 in order to forward requests that local security controller 101 receives for further or different analysis by remote security controller 103 and to receive security protections that the closest remote security controller 103 activates based on the analysis for that local security controller 101.

Remote security controller 103 enforces various protections that may not be run on local security controller 101 or that supplement the protections that may be run on local security controller 101. For instance, remote security controller 103 may perform stateful and/or distributed protections that require remote security controller 103 to track the number of requests and/or types of requests that a particular client device sends to one or more local security controllers 101 or that target the same application running on different local security controllers. Similarly, remote security controller 103 may perform stateful protections that track request patterns from one or more client devices across different local security controllers 101 to determine if one local security controller 101 is receiving an abnormal or divergent request pattern. Remote security controller 103 may provide rate limiting protections for local security controllers 101, distributed or fragmented attack protections where behavior across multiple requests is compared in order to detect an attack, bot protections where local analysis of the request by local security controller 101 does not provide enough information to make an attack decision (e.g., the local analysis may be limited to the request headers, whereas the analysis by remote security controller 103 may check against a live database of known bots, updated network addresses of bots, Virtual Private Networks (VPNs) used by bots, bot proxies, Tor nodes associated with bots, and/or other relays of bots), and email validation protections that confirm that an email address determined to be valid by remote security controller 103 checking it has a valid MX record versus a disposable email address.

Figure 3:
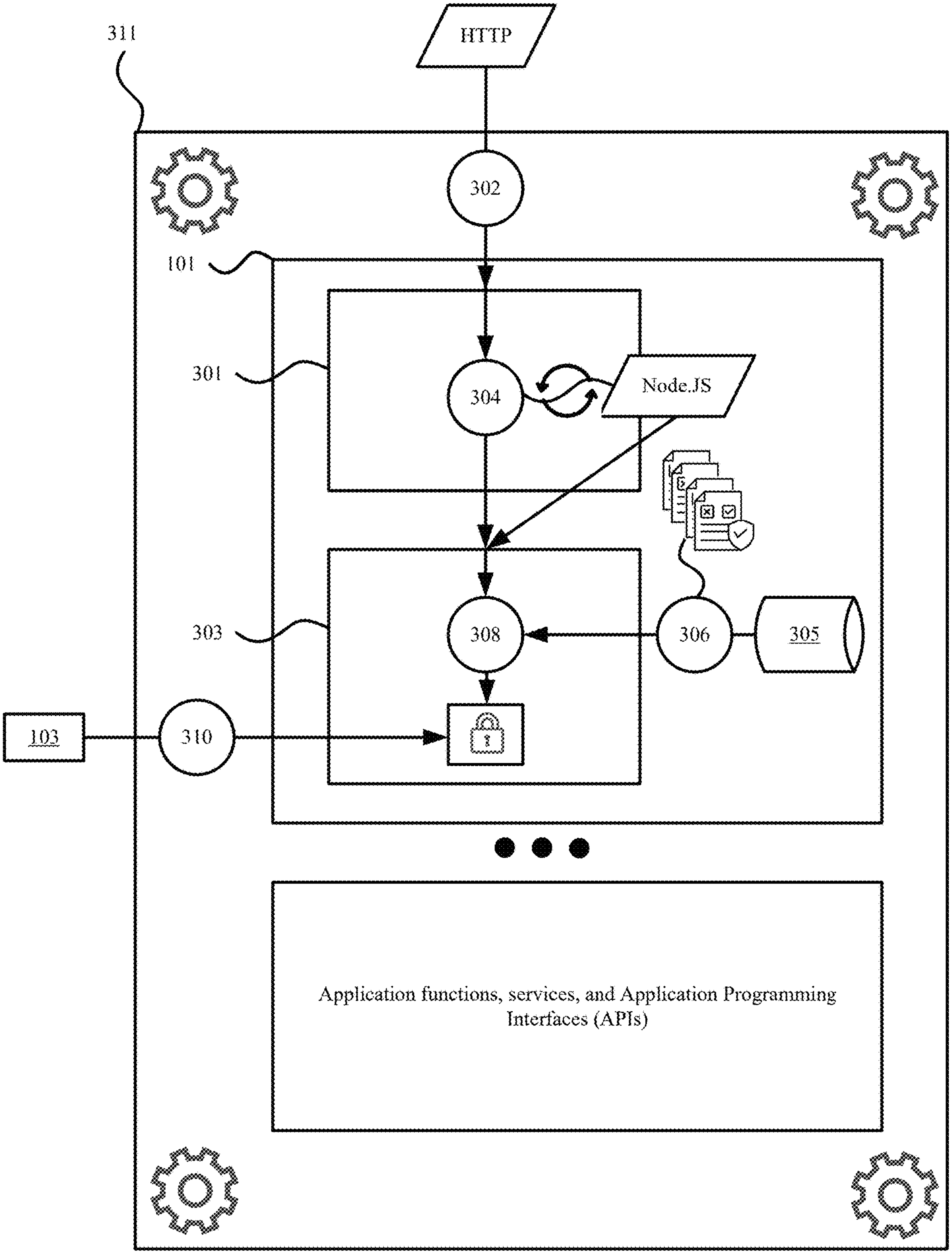
FIG. 3 illustrates an example implementation of the local security controller in accordance with some embodiments.

FIG. 3 illustrates an example implementation of local security controller 101 in accordance with some embodiments. Local security controller 101 includes conversion layer 301, security module 303, and rules datastore 305. In some embodiments, local security controller 101 may be implemented with more or different components.

Local security controller 101 is embedded within the code of application 311 that receives custom protections from local security controller 101. Specifically, local security controller 101 is embedded into particular application 311 by adding the code that invokes conversion layer 301, security module 303, rules datastore 305, and/or other components of local security controller 101 before the code for the functions, services, and/or APIs of application 311. For instance, the code for calling the SDK or functions associated with local security controller 101 are entered into application 311 before the code for the functions, services, and/or APIs of application 311.

Conversion layer 301 receives (at 302) the requests that call, invoke, or trigger execution of one or more functions or services of application 311. The requests may be defined as HTTP GET requests, other HTTP message types, and/or requests that are defined or formatted according to other network protocols or API formats.

Conversion layer 301 converts (at 304) each request from the original first format of the request to a second common format for threat detection and analysis. For instance, conversion layer 301 may convert (at 304) HTTP GET requests for invoking functions or services defined in Bun, Next.js, Node.js, SvelteKit, Deno, Remix, Django, Ruby on Rails, Laravel, and/or other languages or platforms into a common format that local security controller 101 and security module 303 use to inspect the converted request for threats.

Conversion layer 301 passes the converted requests to security module 303. Security module 303 may be defined in the same language as the functions or services of application 311 in order to simplify the integration of local security controller 101 into application 311. For instance, if the developer is familiar and has coded their application in Node.js, then Node.js may be used to define the operations and security checks that security module 303 performs and/or customize the protections that security module 303 provides for application 311.

Security module 303 accesses (at 306) rules datastore 305, and retrieves various customized rules that are defined for application 311. When local security controller 101 is defined or embedded in different applications, the rules configured in rules datastore 305 for each instance of local security controller 101 may be customized or different. Accordingly, first and second sets of rules configured for first and second instances of local security controller 101 may specify email validation rules. However, the first set of rules may be customized to protect against a first set of email addresses or address formats that should not access the application protected by the first instance of local security controller 101, and the second set of rules may be customized to protect against a different second set of email address or address formats that should not access the different application protected by the second instance of local security controller 101.

Rules datastore 305 may be configured with security rules that are application specific or that are customized for the usage of the application. For instance, the security rules may be customized for the types of data or services that are accessed through the protected application, the expected usage pattern of the protected application, the specific format for calling the functions or services of the protected application, and/or the expected set of users that access the protected application. In some embodiments, the security rules are defined directly in the application code such that rules datastore 305 corresponds to the block of code where the rules are defined as opposed to a separate database or data repository. In any case, the security rules define the signature, parameters, or other identifying features of a threat or attack, and include one or more protections to enforce in response to detecting a request, message, or other data matching the signature, parameters, or other identifying features of that threat or attack.

The security rules defined in rules datastore 305 may be remotely updated via a secure remote connection between local security controller 101 running on a first device and updates being issued from a second device. The security rules may also be updated locally by changing the local security controller 101 code within application 311. For instance, a developer may change security rule parameters to change the protection behavior, remove security rules, and add security rules while testing application 311 to determine how application 311 responds to different request or request types or when application 311 is in a production environment. In some embodiments, the security rules may be dynamically defined relative to the application code. In some such embodiments, a security rule and/or the protection associated with that security rule may be adjusted by the application code in response to different signals (e.g., a particular user completed a successful login). Accordingly, the developer has full control over the application security and is not reliant on a security administrator or a third-party WAF or other security solution that is implemented for all applications running on a machine or multiple machines under protection of that security solution. In other words, the developer may respond to detected vulnerabilities or threats in real-time by updating the application code, or by including appropriate application code that responds dynamically at runtime, rather than waiting for a security administrator to implement security changes that affect all applications under protection of the WAF or security solution.

Security module 303 verifies (at 308) the security or safety of each request against the retrieved (at 306) security rules. Since the security checks are performed natively in the application code, there is almost no additional latency or overhead associated with sending data (e.g., the request and/or security decision) back and forth between different nodes (e.g., a first node performing the security checks and a second node executing the application).

To verify (at 308) the security or safety of each request, security module 303 generates and executes in a sandbox environment to separate the execution of the security checks (e.g., screening of requests using the security rules) from the execution of the application services and functions. The sandbox environment prevents the request and any associated code from accessing memory, storage, processing resources, data, or other code of application 311.

In some embodiments, local security controller 101 includes a decision cache. The decision cache may be used to store security decisions that are made by remote security controller 103. For instance, remote security controller 103 may determine that a particular client or set of clients have violated a rate limiting rule, and may activate a security protection against the particular client or the set of clients on one or more local security controllers 101. Local security controller 101 receives the activated security protection from remote security controller 103 and enforces (at 310) the security protection against the particular client or the set of clients. The activated security protection may include the attack signature or identifiers with which to differentiate a request that harbors the attack from legitimate requests. The cache may therefore store a changing list of blocked clients, addresses, or restricted content, services, or functions of application 311 that are active and are to be applied against incoming requests with parameters meeting the conditions of the activated security protections.

If a request does not violate any of the security rules or activated security protections, security module 303 may continue execution of application 311 with the request. For instance, security module 303 may allow the request to call or invoke a targeted function, service, or API of application 311. If the request violates one of the security rules or activated security protections, security module 303 enforces the protection that is specified in the violated security rule or activated security protection against that request.

Figure 4:
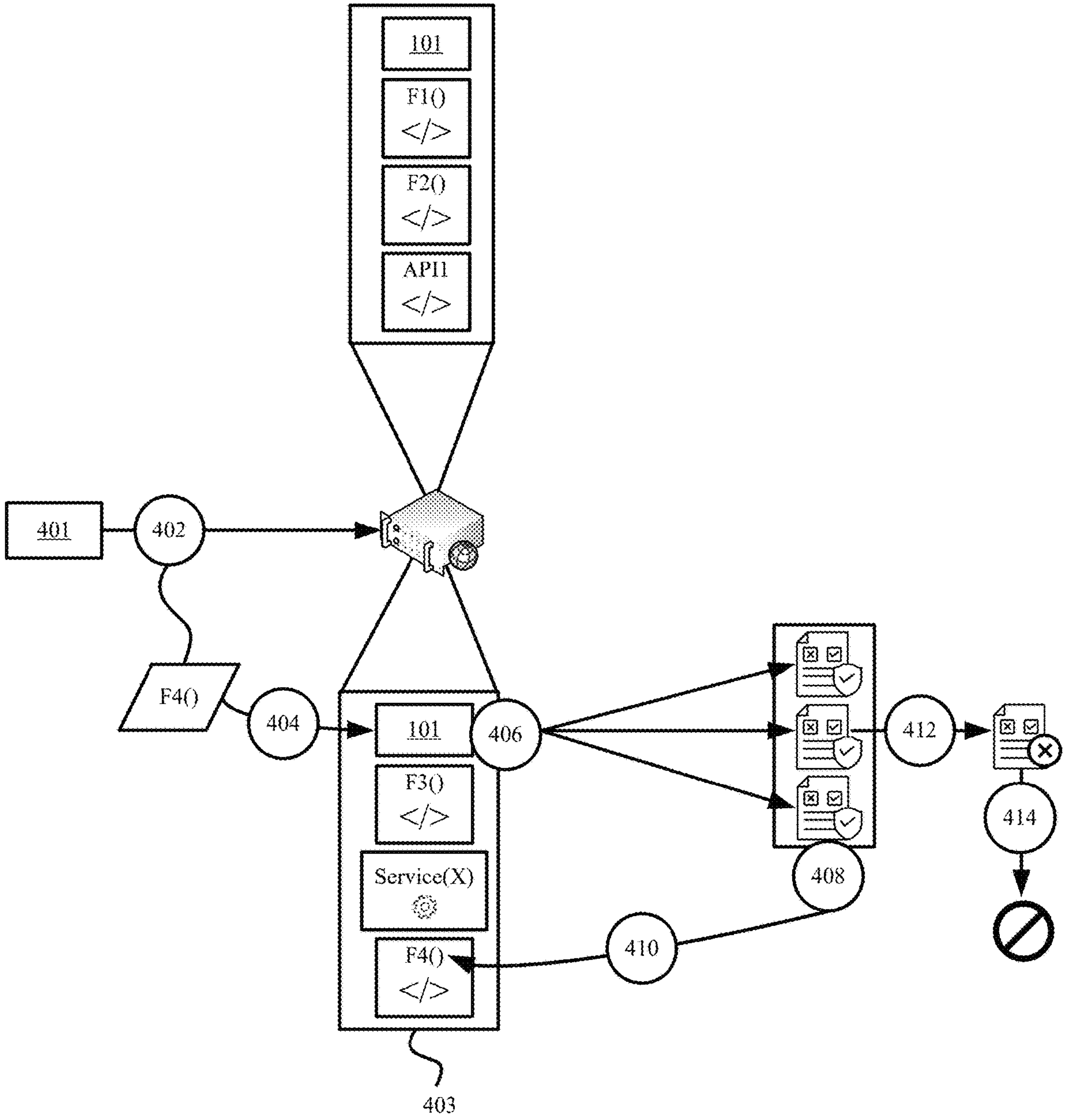
FIG. 4 illustrates an example of the local security controller providing security directly within the code of a particular application in accordance with some embodiments presented herein.

FIG. 4 illustrates an example of local security controller 101 providing security directly within the code of a particular application in accordance with some embodiments presented herein. Client device 401 submits (at 402) a request over a data network to access one or more functions or services of application 403. The request may include a Representational State Transfer (REST) API call, Uniform Resource Locator (URL), command, or other instruction to access the one or more functions or services of application 403.

The request is routed to the device or machine that hosts and/or executes application 403 with zero or more other applications. Local security controller 101 is configured as middleware in application 403 and/or as a first set of executable code within application 403. Local security controller 101 embedded in application 403 intercepts (at 404) the request before other code for the one or more functions or services of application 403 are called or executed.

Local security controller 101, via execution of security module 303 and configured security rules, analyzes (at 406) the request locally as part of the application execution. In response to determining (at 408) that the request does not violate any of the configured security rules, local security controller 101 allows for the remainder of the application code to execute. For instance, local security controller 101 submits (at 410) the request as a parameter or input to a next defined function or code in application 403 or forwards the request to application 403 for processing, wherein processing the request may include calling or invoking a function or service of application 403 that is specified in the request. In response to determining (at 412) that the request violates one or more of the configured security rules, local security controller 101 performs (at 414) one or more protections that are defined as part of the violated security rule. In some embodiments, performing (at 414) the protection may include generating an asynchronous report that is reported to the application developer while application 403 continues to run. The report may identify the request, request parameters, and/or other request data that caused the security rule violation and/or information regarding the security rule that was violated (e.g., potential bot, invalid email address, etc.). The report may be written to a log file for tracking or logging purposes or may be presented in a real-time alert (e.g., email, text message, onscreen alert, etc.). In some embodiments, performing (at 414) the protection may include performing a blocking operation that prevents execution of the application code outside the sandbox environment of local security controller 101. In some such embodiments, performing the blocking operation may include dropping, blocking, or otherwise rejecting the request. An error message may be returned to client device 401. Performing the blocking operation may also include storing the request for subsequent human inspection or removing harmful elements from the request. The actions taken by local security controller 101 for any violated security rule are fully customizable and may be defined as part of the security rule code or definition.

The application-specific reporting provided by local security controller 101 provides added benefits that WAFs and other security solutions for multiple nodes or applications cannot. In particular, the application-specific reporting may identify functions, services, or other parts of the protected application that may be vulnerable or frequently attacked, and the developer may take action to tighten or add security for the identified functions, services, or other parts based on the reporting that the developer has direct access to. Also, the developer may receive a real-time notification of an ongoing or recent attack to a specific part of the application, and may immediately assess the extent of the attack, whether any harm resulted, and/or to take action in response to the attack.

Figure 5:
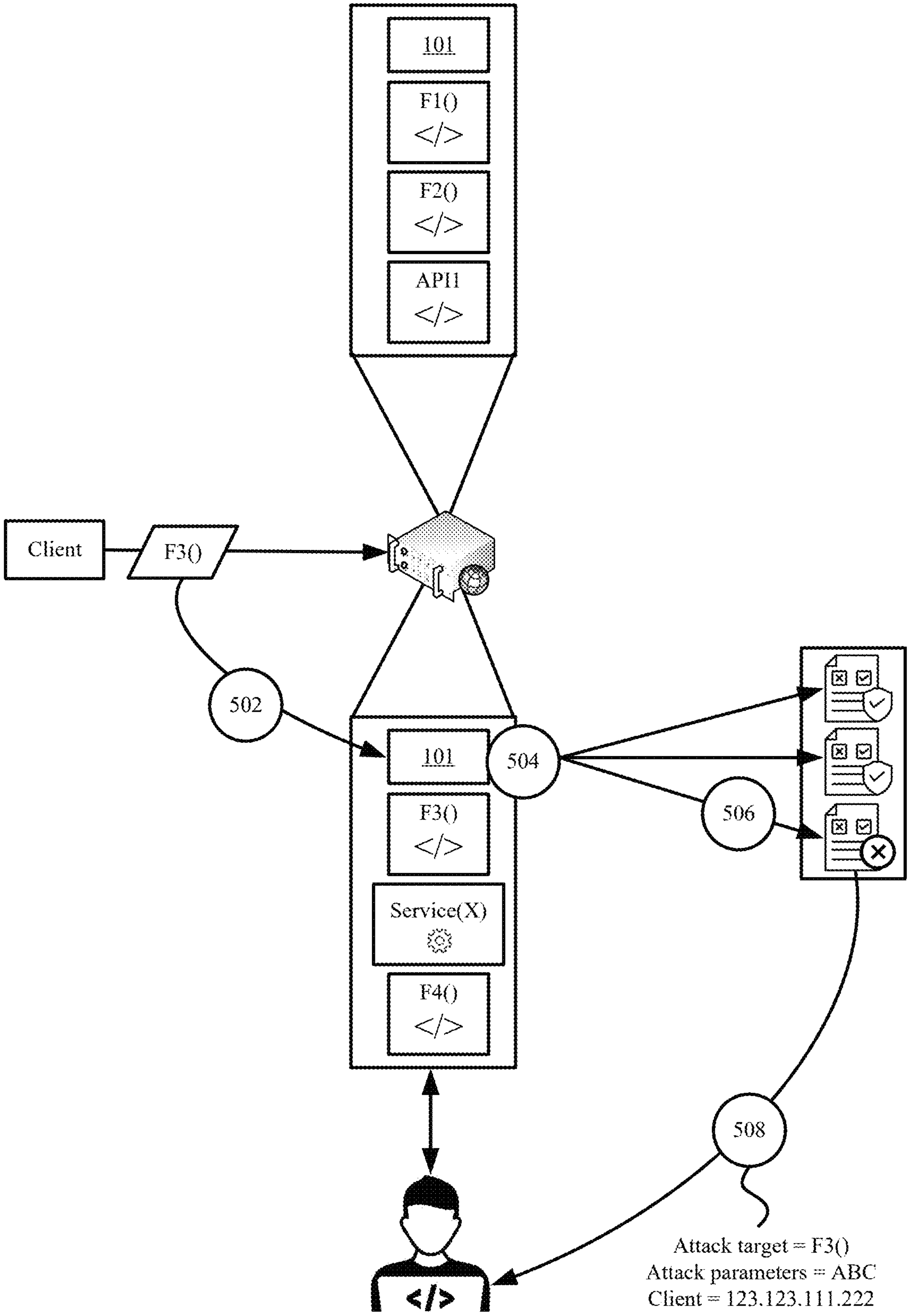
FIG. 5 illustrates an example of the local security controller providing application-specific feedback in response to a security rule violation in accordance with some embodiments presented herein.

FIG. 5 illustrates an example of local security controller 101 providing application-specific feedback in response to a security rule violation in accordance with some embodiments presented herein. Local security controller 101 runs within a particular application (e.g., executes as a first function or first set of code in the particular application definition or program), and intercepts (at 502) a request for invoking one or more functions or services of the particular application.

Local security controller 101 analyzes (at 504) the request against one or more configured security rules in a secure sandbox environment. Local security controller 101 detects (at 506) that the request violates a specific security rule. For instance, the request may contain invalid parameters or values, may be formatted incorrectly, may contain unpermitted code, may contain invalid data, or may include the signature of a specific attack.

Local security controller 101 performs (at 508) a protection action that includes generating a notification to present the security violation to the application developer. The notification may identify the request, the specific security rule that was violated, the parameters or request data that violated the specific security rule, and/or the function or service of the particular application that was implicated or called in the request. In some embodiments, local security controller 101 presents the notification in an application-programming interface, a code editing or execution interface, a command-line interface, a graphical user interface, or a debugging interface of the particular application.

The notification provides the application developer with immediate or instant notice of the security decision and why it was made. The application developer may customize the code of the particular application to further safeguard against the same or related attacks or may monitor subsequent traffic from the requestor. For instance, the application developer may customize the code of local security controller 101 within the code of the particular application in order to change how such requests or security rule violations are handled in the future. Alternatively, the application developer may verify that the request was an attack and should be stopped or safe and should be permitted to call the particular application functions or services specified in the request. The application developer may also customize the code of local security controller 101 to refine the handling of different use cases after manual inspection. For instance, the application developer may modify the security rule to apply to requests originating only from devices or users that are not logged in and to allow requests originating from devices or users that are logged in to access the functions or services of the particular application. Similarly, the application developer may tune the security rule to apply to users on specific pricing plans or subscription plans, to specific database attributes, and/or to allow for different usage by different users based on their past usage of the particular application functions or services. The application developer may also monitor subsequent traffic from the requestor to manually determine if the requestor is a bad actor (i.e., attacker) or a legitimate user.

The protective action for the violated security rule may also be changed or modified by the application developer in response to the notification. For instance, rather than block the request, the protective action may be changed to force the requesting user or device to reauthenticate and/or login with a valid set of credentials. In some embodiments, local security controller 101 may block the request that violates the security rule from further execution in the particular application until the application developer views the notification and makes a decision to permit the continued execution or to block the request.

Since different security rules may be defined for different applications running on the same node or device, the security rules may be defined to be specific to the protected application. In some embodiments, the security rules may be defined based on the context of the application. For instance, the security rules may be defined based on the operations or data that are accessible from the application, the language or format with which the application functions and services are defined or accessed, and/or the manner with which the functions or services of the application are used or called.

Figure 6:
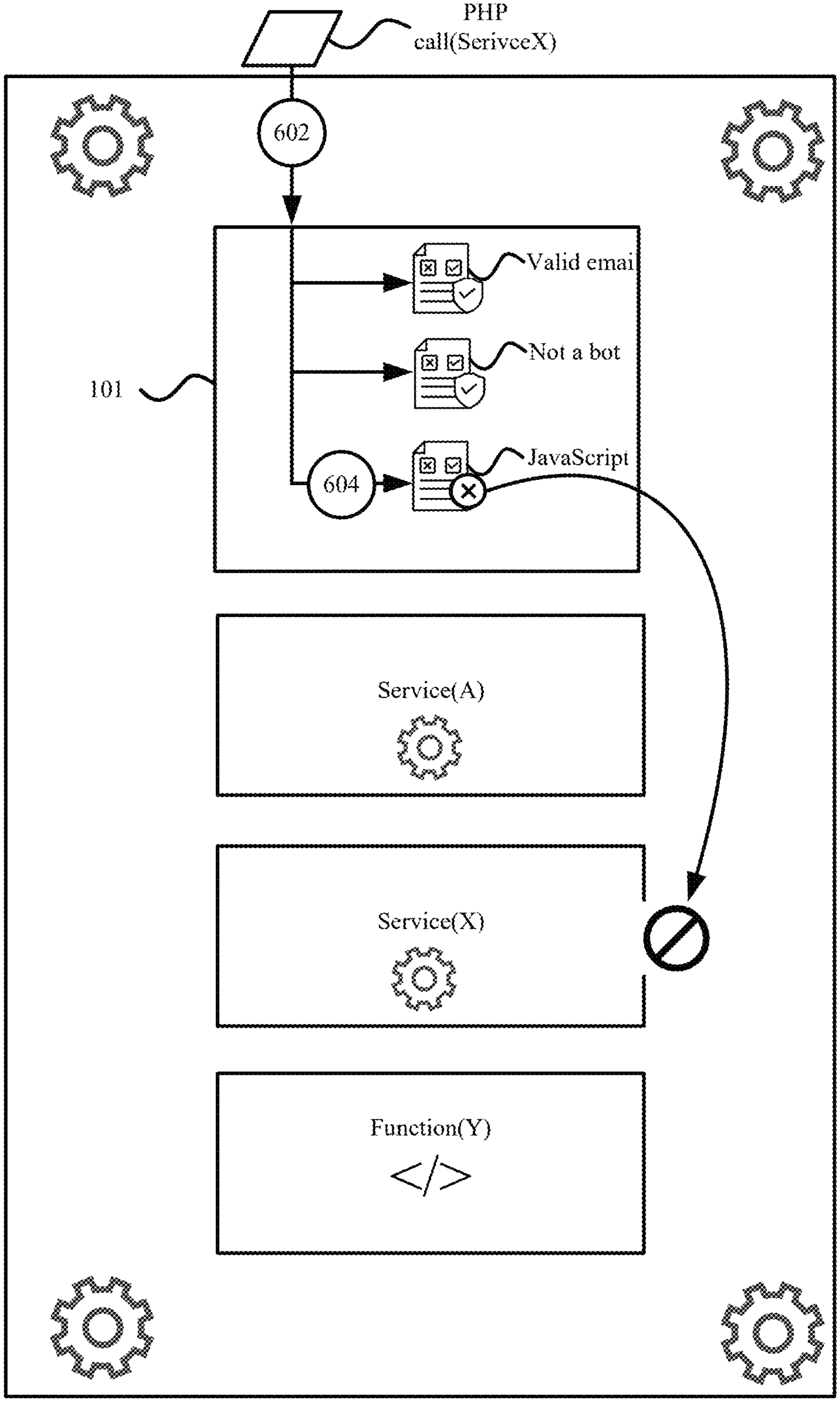
FIG. 6 illustrates an example of enforcing a security rule within an application that is defined according to specific context of the application in accordance with some embodiments presented.

FIG. 6 illustrates an example of enforcing a security rule within an application that is defined according to specific context of the application in accordance with some embodiments presented. Local security controller 101 receives (at 602) a request that is directed to or that invokes a service of the application. Local security controller 101 executes as part of the application and is defined in the application code. Accordingly, local security controller 101 intercepts the request before the request calls or causes execution of the targeted application service.

Local security controller 101 is configured with one or more security rules that are specific to the particular application context. For instance, the particular application is written in JavaScript using Next.JS. The one or more security rules may be defined to reject any request that is written or formatted with PHP code or that deviates from the JavaScript format. More specifically, the one or more security rules are configured or defined for a JavaScript application. Threats or attacks that are specific to a PHP application or that contain malicious code or any PHP code may be rejected based on the application context provided to the one or more security rules. Such security rules may not be possible if defined as part of a WAF or a security solution that provides security for several applications that are accessible from a particular site or node.

Local security controller 101 determines (at 604) that the request contains PHP code and therefore violates the one or more security rules despite the PHP code being innocuous or seemingly valid. Local security controller 101 blocks (at 606) the request containing the PHP code because of the contextual mismatch between the request and the particular application code and/or the context of the targeted service. Depending on the context of the application or the targeted application functions or services, security rules may be defined to block or flag requests that contain Structured Query Language (SQL) formatted code, out-of-range parameters, invalid formatting or syntax, invalid commands, and other parameters, code, or values that deviate from the application context.

Figure 7:
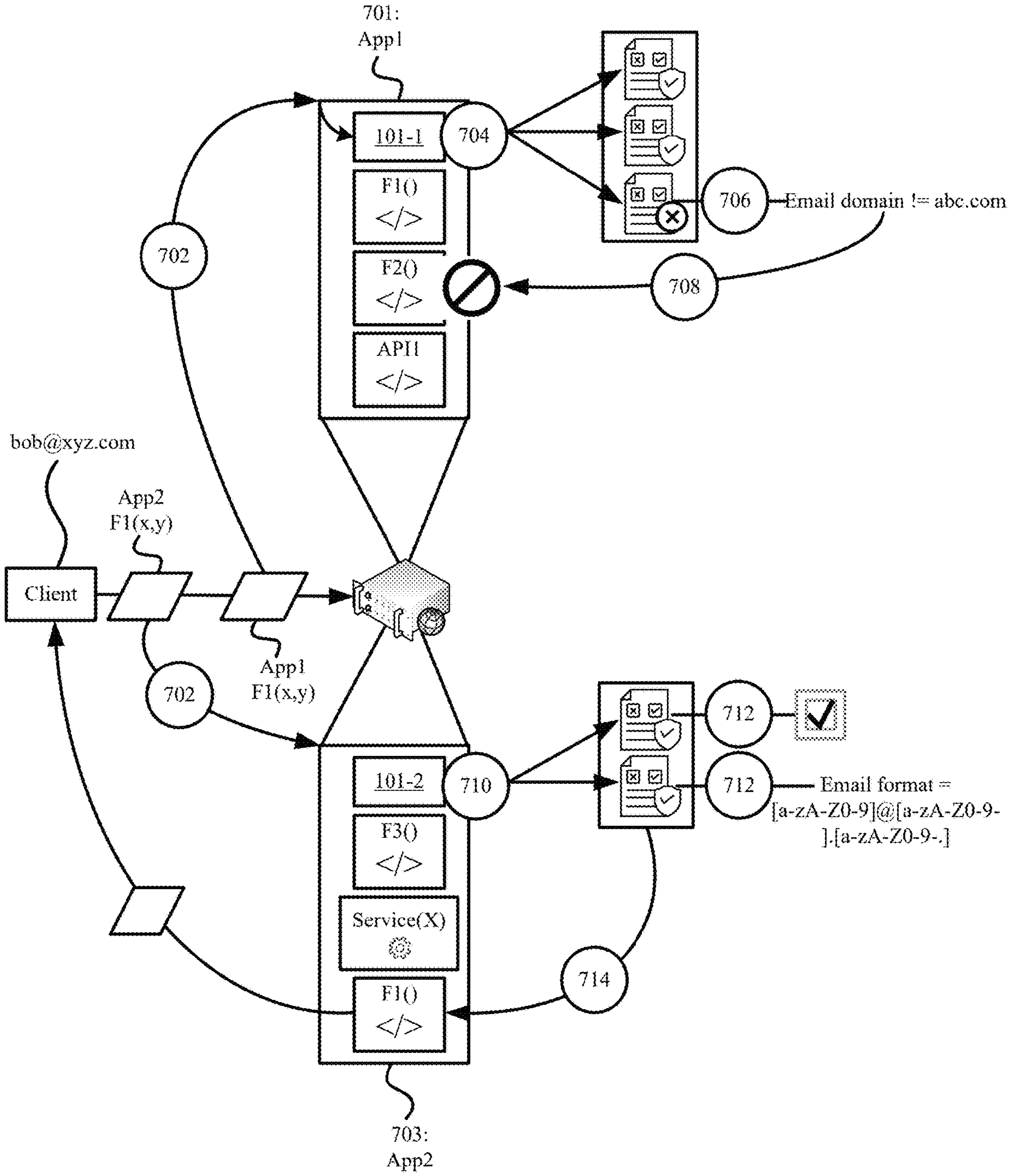
FIG. 7 illustrates an example of the local security controller enforcing different security protections for two different applications running on the same device or node in accordance with some embodiments presented herein.

FIG. 7 illustrates an example of local security controller 101 enforcing different security protections for two different applications running on the same device or node in accordance with some embodiments presented herein. First application 701 and second application 703 receive (at 702) the same request. The requests are directed to the same function of the different applications 701 and 703 and include the same parameters.

First local security controller 101-1 embedded in the code of first application 701 receives the request that is directed to first application 701, analyzes (at 704) the request against a first set of security rules that are configured for first local security controller 101-1, and determines (at 706) that the email address of the request sender violates an email validation rule from the first set of security rules. Specifically, the email address is a valid address. However, the email address is sent from an unauthorized or unpermitted domain that violates the email validation rule. Accordingly, first local security controller 101-1 performs (at 708) a first protective action that is defined for the violated email validation rule. Performing (at 708) the first protective action includes blocking the request from calling any functions or services of first application 701.

Second local security controller 101-2 embedded in the code of second application 703 receives the request that is directed to second application 703, analyzes (at 710) the request against a second set of security rules that are configured for second local security controller 101-2, and determines (at 712) that the email address of the request sender does not violate a different email validation rule or any other security rule from the second set of security rules. Accordingly, second local security controller 101-2 releases the request from the sandbox or secure environment of second local security controller 101-2 allowing the request to call (at 714) or invoke one or more of the functions or services of second application 703.

By executing local security controller 101 within the code of the called or requested application and as part of the application itself, local security controller 101 maintains data privacy and security. Personal identifying information, email addresses, credit card numbers, and/or other sensitive data remains within the application while the security checks are performed by local security controller 101 and when cleared for use by functions, services, and/or APIs of the application. If the sensitive data should not be exposed to the application or is improperly accessed from the application, local security controller 101 may run within the application to prevent the sensitive data from reaching the application functions, services, and/or APIs and to prevent the application from returning the sensitive data to the requesting client.

Figure 8:
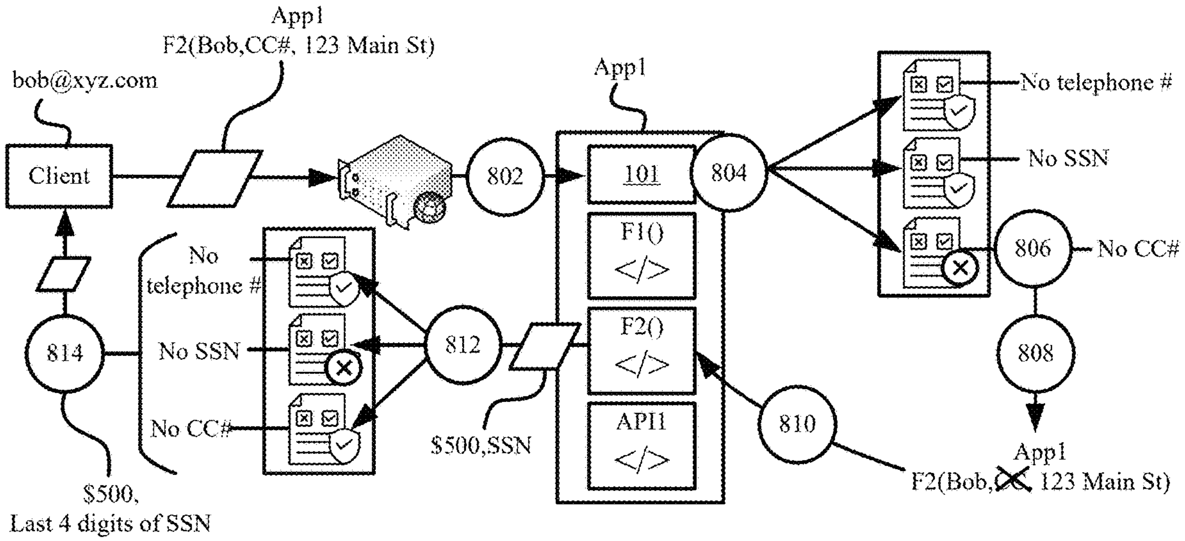
FIG. 8 illustrates an example of the local security controller preventing exposure of sensitive data to and from an application while running within the application in accordance with some embodiments presented herein.

FIG. 8 illustrates an example of local security controller 101 preventing exposure of sensitive data to and from an application while running within the application in accordance with some embodiments presented herein. A request that calls or invokes one or more functions, services, or APIs of an application is provided to the application.

Local security controller 101 runs within the application and intercepts (at 802) the request prior to the request calling or invoking any of the application functionality. Local security controller 101 analyzes (at 804) the request according to the configured security rules for that application. Specifically, the configured security rules may specify types of sensitive information that cannot be included in the request and that cannot be accessed or returned from the application. As before, the analysis (at 804) is performed within a WebAssembly module of local security controller 101 that provides a secure sandbox environment for the analysis (at 804).

The analysis (at 804) determines whether the request is a string. In response to detecting a string within the request, local security controller 101 converts the string into tokens. For instance, local security controller 101 may split the string into segments that are separated by whitespace, and may remove punctuation marks from the segments.

Local security controller 101 applies one or more security rules for detecting sensitive information to the segments. The security rules may be defined to detect formats, patterns, or other common elements of different types of sensitive information (e.g., social security numbers, telephone numbers, email addresses, credit card numbers, personal identifying information, etc.).

In response to detecting (at 806) sensitive information in one or more segments, local security controller 101 performs (at 808) a protective action. In some embodiments, performing (at 808) the protective action includes removing or blocking the segment or the request from the application. In this example, performing (at 808) the protective action includes redacting the sensitive information. Redacting the sensitive information may include obfuscating, removing part (e.g., removing or replacing characters) of the sensitive information, or otherwise retaining the parsed segment without the sensitive information being readable. In response to determining that no sensitive information is contained in the segments or removing the sensitive information from the request, local security controller 101 issues (at 810) the verified request to the targeted function, service, or API of the application provided that the request passes other security checks performed by local security controller 101. In any case, the sensitive information is not exposed outside local security controller 101 or the application in which local security controller 101 executes.

Local security controller 101 may also perform (at 812) the same or different security checks on the response that the called function, service, or API of the application generates for the verified request. For instance, the request may call an API function from within the application. Local security controller 101 receives and/or intercepts the API function output before it is returned to the requesting client device. Local security controller 101 may inspect the application output using the same or different security rules that were used to analyze (at 804) the request. In any case, local security controller 101 may inspect the application output for sensitive information. The sensitive information may include data that is accessed without permission or data that should not be exposed from the API or the application. Local security controller 101 may redact (at 814) or block the sensitive information from the application output, may generate an alert to notify the application developer of the accessed data, and/or may block the requesting client from further access to the application or API.

The security protections provided by local security controller 101 may be enhanced by communicably coupling local security controller 101 with remote security controller 103. Remote security controller 103 may be communicably coupled to multiple local security controllers 101 in order to detect distributed attacks, may be communicably coupled to external data or security resources in order to detect new or emerging threats, and/or may have additional resources for screening advanced or lower-level threat detection. In other words, remote security controller 103 enhances or supplements the protections that may be offered locally or within the application by local security controller 101.

Remote security controller 103 may perform the additional security verifications asynchronously and remotely in the "cloud" so as to not delay or block performance of the protected application. Should a security violation or attack be detected by remote security controller 103, remote security controller 103 may notify local security controller 101 of the security violation or attack, and local security controller 101 may implement protections that remote security controller 103 remotely activates.

Figure 9:
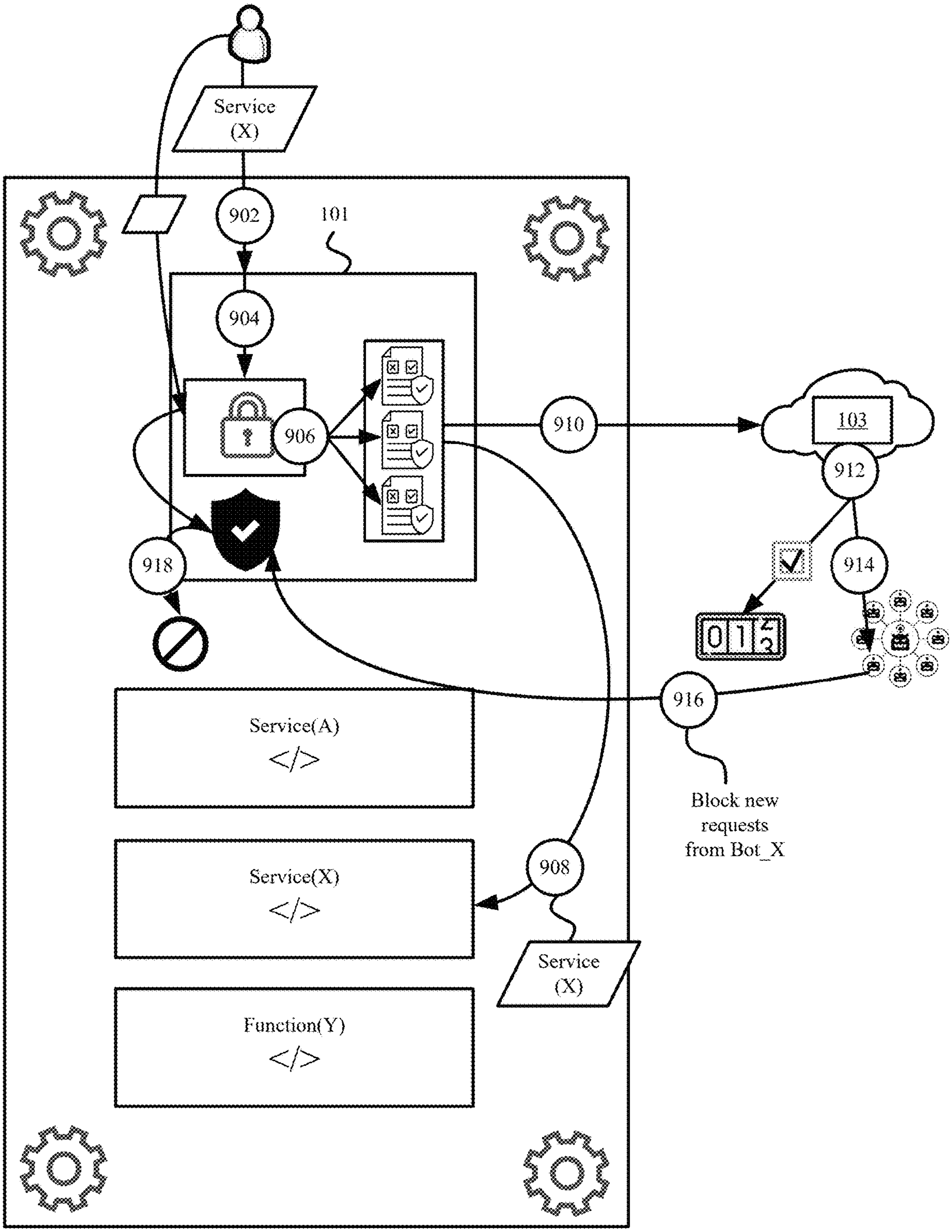
FIG. 9 illustrates an example of a remote security controller of the application-integrated security system supplementing protections provided by the local security controller in accordance with some embodiments presented herein.

FIG. 9 illustrates an example of remote security controller 103 supplementing protections provided by local security controller 101 in accordance with some embodiments presented herein. Local security controller 101 is defined and initialized in the code of a particular application before code for functions, services, and/or APIs of the particular application are accessed or invoked.

A client device issues a request to call, invoke, or access one or more of the particular application functions, services, or APIs. The request routes over a data network to a host device or node that executes the particular application.

The request is passed to the particular application. However, the code for local security controller 101 executes before the code for the one or more targeted functions, services, or APIs of the particular application. Local security controller 101 receives (at 902) the request, generates (at 904) a secure sandbox environment for execution in and secure screening of the request, and evaluates (at 906) the safety of the request using the security rules that are configured or defined for local security controller 101.

In response to determining that the request does not violate any of the security rules, local security controller 101 forwards (at 908) the request to the targeted function, service, or API of the particular application. In some embodiments, forwarding (at 908) the request to the targeted function, service, or API may include continuing execution of the particular application by processing the code that is defined after the code of local security controller 101 in the particular application. In some embodiments, forwarding (at 908) the request may include processing the request to call, invoke, or execute a function, service, or API of the particular application.

Also in response to determining that the request does not violate any of the security rules, local security controller 101 asynchronously passes (at 910) the request over a data network to a remote device or node running remote security controller 103. Local security controller 101 may forward (at 908) the request for further processing in the particular application as it simultaneously or contemporaneously passes (at 910) the request to remote security controller 103.

In some embodiments, local security controller 101 is configured with the network address or a URL with which to access remote security controller 103. In some embodiments, local security controller 101 performs a network discovery procedure or relies on network routing techniques to pass (at 910) the request to remote security controller 103 running on a device or node that is the fewest network hops away from the device or node running the particular application. For instance, the URL for accessing remote security controller 103 may resolve to an Anycast address or a Unicast address for the closest device or node running remote security controller 103.

Remote security controller 103 receives (at 910) the request from local security controller 101. Remote security controller 103 screens (at 912) the request for different security threats or attacks than those configured in the security rules of local security controller 101. Remote security controller 103 may be configured with a different set of security rules for screening (at 912) the request for the different security threats or attacks.

In some embodiments, remote security controller 103 screens (at 912) the request for stateful attacks. For instance, remote security controller 103 tracks the number of requests that target a specific function, service, or API of the particular application in a given amount of time by each requesting device or by a group of requesting devices. Remote security controller 103 screens (at 912) for a rate limiting attack based on the tracked number of requests in the given amount of time exceeding a rate limiting threshold. Remote security controller 103 may also screen (at 912) for sophisticated and/or distributed rate limiting attacks or botnet attacks that may distribute requests across different devices or nodes executing the particular application. For instance, remote security controller 103 may track the number of times that a specific function of the particular application is called on different devices or nodes running the particular application based on the forwarded requests received from the different local security controllers 101 running on those devices or nodes, and may detect the sophisticated and/or distributed rate limiting attacks or botnet attacks based on the cumulative count exceeding a threshold.

In some embodiments, remote security controller 103 screens (at 912) the request using data from external sources that may not be available to local security controller 101 or that would take too long to retrieve, store, and process by local security controller 101. For instance, local security controller 101 may perform a first level of email validation that includes checking email addresses specified in the request body or request metadata for valid email syntax (e.g., xxxx@yyy.zzz). Remote security controller 103 may perform a second level of email validation that includes verifying the email address. Verifying the email address may include determining if the specified email address has a valid MX record or is associated with a disposable email address.

In some embodiments, remote security controller 103 screens (at 912) the request for a stateful attack that matches an invalid request sequence. In some such embodiments, remote security controller 103 may track expected usage or call sequences for a particular application. For instance, remote security controller 103 may determine that 80% of users use the particular application in a common manner by calling functions, services, or APIs of the particular application in a frequently repeating pattern (e.g., call a first function, then a second function, then execute a first service, and end with a call to a third function). Remote security controller 103 may track requests issued by each client when accessing the particular application and compare the tracked sequence to the expected sequence. An attack may be detected when the tracked sequence deviates significantly from the expected sequence. For instance, an attack may include repeatedly calling the same function with different parameters rather than using the output of the function to invoke a next function or service in the expected usage sequence.

In some embodiments, remote security controller 103 screens (at 912) the request for a bot attack. Remote security controller 103 may maintain or periodically access a live database of known bots, network addresses associated with bots, VPNs used by bots, bot proxies, Tor nodes associated with bots, and/or other relays of bots rather than have each instance of local security controller 101 retrieve the bot list whenever it is initialized and add delay of file size to the local security checks performed inside the application. Remote security controller 103 may screen (at 912) forwarded requests from different local security controllers 101 against the bot list to determine if the requests are originating from a bot or botnet.

In response to remote security controller 103 detecting (at 914) an attack or a security violation, remote security controller 103 directs (at 916) local security controller 101 that forwarded the suspicious or malicious request to activate the protection that is defined for that attack or security violation. In some embodiments, remote security controller 103 may direct (at 916) two or more local security controllers 101 to activate the same protection at the same time. For instance, remote security controller 103 may track all devices or nodes running an application that is affected by a specific distributed attack, and may direct (at 916) local security controller 101 running within the application of the affected devices or nodes to activate the protection.

Local security controller 101 receives the command to activate the protection from remote security controller 103, caches the attack signature, and enforces (at 918) the protection. The asynchronous attack detection and activation of the protection may take tens of milliseconds to complete. Moreover, since the detection and activation occur asynchronous to the particular application processing or executing the request, local security controller 101 may enforce (at 918) the protection against subsequent requests that contain the attack signature and that arrive after the current request has been processed by the particular application.

In some embodiments, local security controller 101 may operate in a blocking manner and may withhold forwarding the request to the targeted functions, services, and/or APIs of the particular application until remote security controller 103 has analyzed the request and provided a response as to any threats posed by the request. In some such embodiments, local security controller 101 may include a timeout for each forwarded request. Local security controller 101 may unblock and forward the request if local security controller 101 does not receive a response from remote security controller 103 before expiration of the timeout. The timeout ensures continued operation of the particular application in the event of a network interruption or remote security controller 103 becoming temporarily unavailable or inaccessible.

Figure 10:
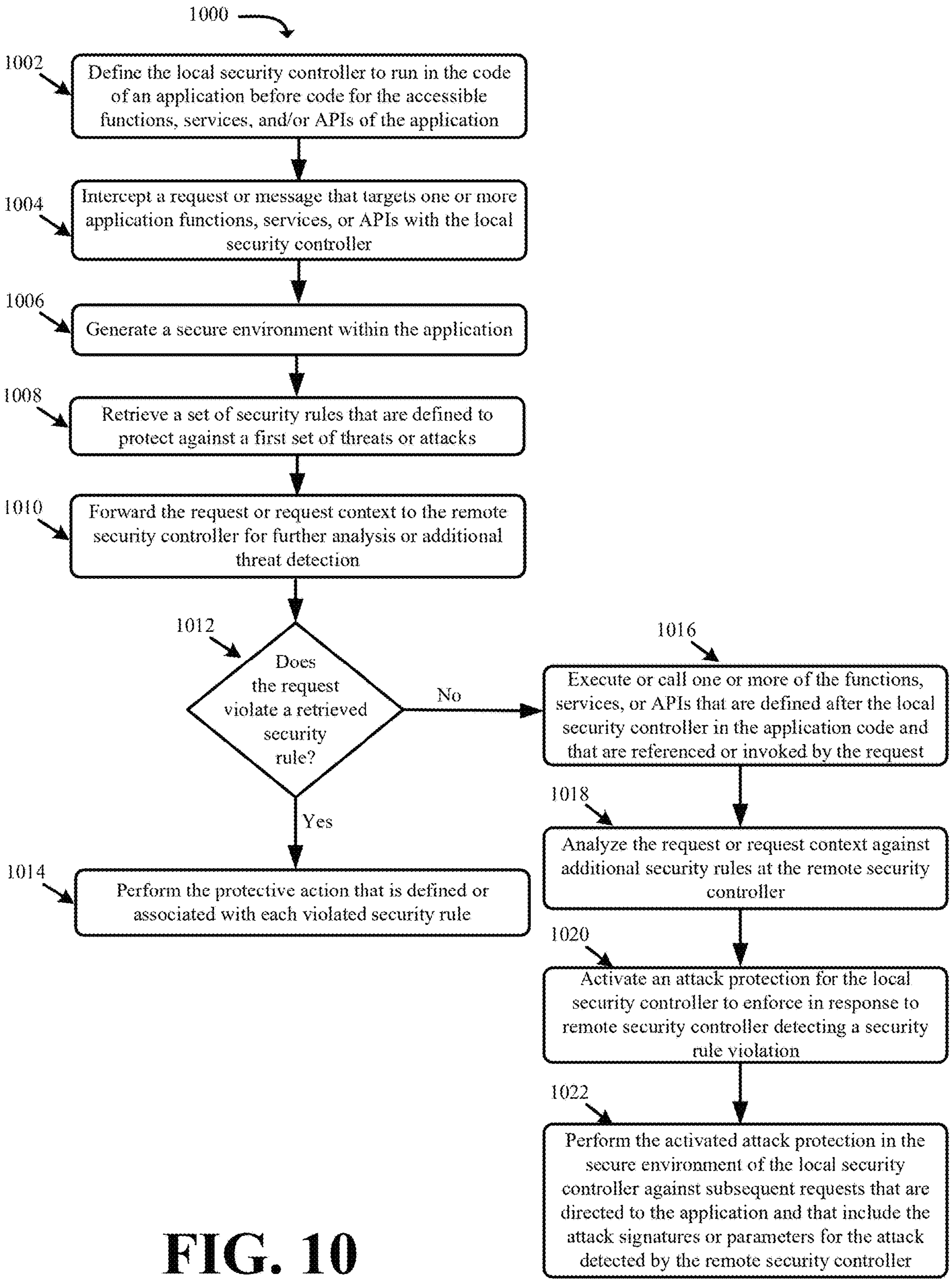
FIG. 10 presents a process for providing the application-integrated security in accordance with some embodiments presented herein.

FIG. 10 presents a process 1000 for providing the application-integrated security in accordance with some embodiments presented herein. Process 1000 is implemented by application-integrated security system 100. Application-integrated security system 100 includes local security controller 101 that executes as part of an application running on a first device, machine, or node with processor, memory, storage, network, and/or other hardware resources, and remote security controller 103 that executes on a second device, machine, or node with processor, memory, storage, network, and/or other hardware resources.

Process 1000 includes defining (at 1002) local security controller 101 in the code of an application to provide customized security for the functions, services, and/or APIs that are defined and/or accessed in subsequent code of the application. Defining (at 1002) local security controller 101 includes embedding or integrating local security controller 101 to run or be called before the code for the functions, services, and/or APIs of the application. For instance, one or more declarations may be added to load and execute the SDK of local security controller 101 and additional code may be specified for the custom security rules that local security controller 101 uses to protect the application from attack.

Process 1000 includes intercepting (at 1004) a request or message that targets one or more application functions, services, or APIs in response to execution of local security controller 101 occurring before execution of targeted functions, services, or APIs. Specifically, the code for local security controller 101 is executed in response to every request or message that is directed to the application, and execution of local security controller 101 includes receiving the request or message and blocking further execution of the application code until execution of local security controller 101 is complete for that request or message.

Process 1000 includes generating (at 1006) a secure environment within the application to assess the risk or security threat posed by the request. In some embodiments, local security controller 101 generates (at 1006) the secure environment in response to intercepting (at 1004) the request or message. In some other embodiments, local security controller 101 generates (at 1006) the secure environment when the application is initialized and prior to intercepting (at 1004) any request or message.

Generating (at 1006) the secure environment may include creating a sandbox environment with resources that are not shared with resources that were previously allocated for the execution of the application. For instance, local security controller 101 may generate a virtual machine where malware, viruses, and/or other attacks in the request may be analyzed without having shared access to memory, buffers, or processing resources of the application. Generating (at 1006) the secure environment may include initiating a WebAssembly module.

Process 1000 includes retrieving (at 1008) a set of security rules that are defined to protect against a first set of threats or attacks. Each security rule may be defined with the signature of an attack or the parameters, values, structure, and/or other identifying characteristics of a threat or attack. The set of security rules may be customized based on the application context. For instance, the set of security rules may be defined relative to the functions, services, and/or APIs of the application, for specific attacks against those functions, services, and/or APIs, in relation to acceptable values and parameters for the functions, services, and/or APIs, and/or relative to expected usage of the functions, services, and/or APIs.

Process 1000 includes forwarding (at 1010) the request or request context to remote security controller 103 of security system 100 for further analysis or additional threat detection. In some embodiments, local security controller 101 may forward (at 1010) the request or request context while also analyzing the request against the retrieved (at 1008) set of security rules. In some other embodiments, local security controller 101 may forward (at 1010) the request or request context after completing the analysis of the request and determining that the request does not violate any of the retrieved (at 1008) set of security rules. In some embodiments, the request context is forwarded (at 1010) instead of the original request to minimize the amount of data that is passed and/or to prevent transmission of sensitive information that may be included with the original request. The request context may include a subset of data from the request that is relevant for the additional analysis performed by remote security controller 103. Local security controller 101 may establish a persistent network connection with remote security controller 103 prior to forwarding (at 1010) the request or request context to remote security controller 103. Local security controller 101 may establish the persistent connection upon initialization and/or when local security controller 101 commences execution (prior to any requests being intercepted (at 1004)). From the persistent network connection, remote security controller 103 may identify which local security controller 101 submits the request or request context and may route a response to the request or request context to the correct local security controller 101.

Process 1000 includes determining (at 1012) whether the request violates any of the retrieved (at 1008) set of security rules from within the secure environment. In some embodiments, local security controller 101 analyzes the format of the request, request parameters, header values, metadata, and/or other data sent in conjunction with the request for signatures or identifying characteristics of an attack or threat as defined in the one of the set of security rules. The request format may violate a security rule when it deviates from an acceptable format of the application functions, services, and/or APIs. For instance, the request format may violate a security rule when the request is defined in a different language than the functions, services, and/or APIs. The request parameters may include query string parameters, cookies, values, and/or code that may be used to effectuate an attack. The request parameters may be compared against the security rules to detect invalid or impressible content. Additionally, local security controller 101 may execute any code or function associated with the request parameters to detect malicious activity. The header values identify the sending device, and may be used to determine if the sending device is authorized to access a requested function, service, or API of the application. In some embodiments, local security controller 101 executes other code or scripts from the request within the secure environment to determine (at 1012) if the request violates any of the retrieved (at 1008) set of security rules.

In response to determining (at 1012—Yes) that the request violates one or more of the retrieved (at 1008) set of security rules, process 1000 includes performing (at 1014) the protective action that is defined or associated with each violated security rule. The protective action may be coded or defined as part of the violated security rule. Performing (at 1014) the protective action may include blocking or restricting the request, redacting information from the request, and/or generating a notification or alert for the application developer with information about the violated security rule, the parts of the request that violated the security rule, the sending device, and/or other information that aids the application developer in diagnosing the attack and/or vulnerabilities that the attacker attempted to exploit. In any case, the protective action may correspond to executable code or instructions and may therefore be customized to perform any action specified by the application developer.

In response to determining (at 1012—No) that the request does not violate any of the retrieved (at 1008) set of security rules, process 1000 includes continuing execution of the application by executing or calling (at 1016) one or more of the functions, services, or APIs that are defined after local security controller 101 in the application code and that are referenced or invoked by the request.

Process 1000 includes analyzing (at 1018) the request or request context against additional security rules at remote security controller 103. Remote security controller 103 may perform a stateful analysis of the request or request context in order to identify attacks that span two or more requests sent from the same client or different clients (e.g., volumetric attacks that violate rate limiting rules). Remote security controller 103 may also perform a deeper analysis of the request or request context by comparing the request or request context to attack data from third-party or external sources. For instance, remote security controller 103 may compare email addresses against MX records, may compare the sender against lists of bots that are updated or tracked by third-party sources, and/or may compare the request behavior against modeled usage behavior of the application.

Process 1000 includes activating (at 1020) an attack protection for local security controller 101 to enforce in response to remote security controller 103 detecting a security rule violation. Activating (at 1020) the attack protection includes remote security controller 103 issuing a command or instruction to local security controller 101 that includes an attack signature or parameters for identifying an attack and the action that local security controller 101 is to implement in response to receiving a request that matches or includes the attack signature or parameters of the identified attack. Local security controller 101 caches the attack signature and action.

Process 1000 includes performing (at 1022) the activated (at 1020) attack protection in the secure environment of local security controller 101 against subsequent requests that are directed to the application and that include the attack signatures or parameters for the attack detected by remote security controller 103. Accordingly, local security controller 101 enforces the security protections defined in the retrieved (at 1008) set of security rules and the attack protections activated (at 1020) by remote security controller 103 against subsequently received requests.

Figure 11:
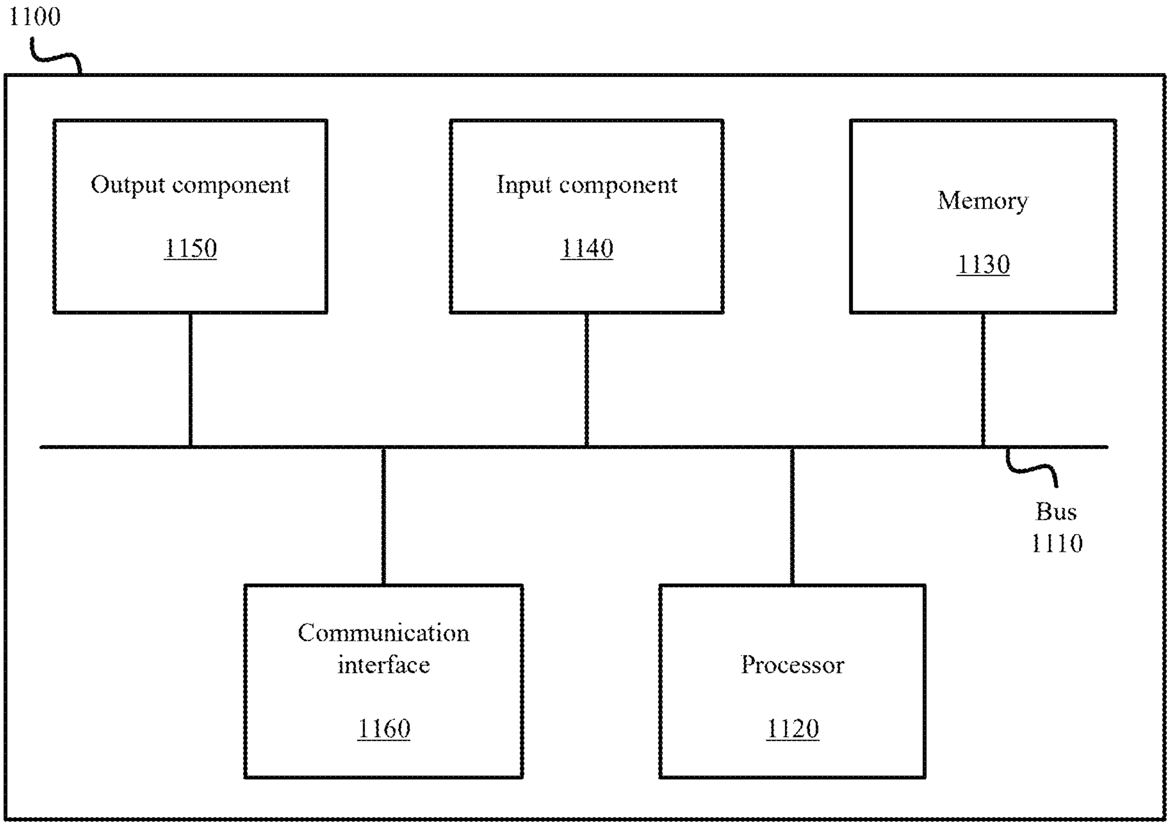
FIG. 11 illustrates example components of one or more devices, according to one or more embodiments described herein.

FIG. 11 is a diagram of example components of device 1100. Device 1100 may be used to implement one or more of the tools, devices, or systems described above (e.g., security system 100, local security controller 101, remote security controller 103, requesting client devices, devices executing the targeted applications, etc.). Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more LEDs, etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:

embedding a first set of code of a local security controller in a second set of code of a particular application, wherein the particular application runs on an operating system of a device with other applications that provide a plurality of different functions and services to other requesting devices;

executing the particular application in response to a request that is directed to a function or service of the particular application, wherein executing the particular application comprises intercepting the request by the local security controller based on the first set of code executing before code from the second set of code associated with the function or service in the particular application is called or executed;

generating a secure environment within the particular application in response to intercepting the request and based on execution of the first set of code embedded in the particular application, wherein generating the secure environment comprises allocating resources to the secure environment that are not shared with memory or resources previously allocated for execution of the particular application, and wherein the secure environment prevents the request and code or a script included with the request from accessing the memory and the resources that were previously allocated for execution of the particular application;

analyzing, within the secure environment, parameters of the request that call or invoke the function or service against a set of application-specific security rules configured in the first set of code, wherein analyzing the parameters of the request comprises:

executing the code or the script that is included with the request using the resources allocated to the secure environment without permitting the code or the script to access the memory or the resources that were previously allocated for execution of the particular application; and determining whether the request violates one or more of the set of application-specific security rules based on malicious activity that is detected from executing the code or the script within the secure environment;

resuming execution of the second set of code in response to the request not violating any of the set of application-specific security rules, wherein resuming execution of the second set of code comprises invoking the function or service of the particular application with the request; and performing a protective action that is defined as part of a security rule from the set of application-specific security rules in response to the request violating the security rule, wherein performing the protective action comprises blocking execution of the second set of code.

2. The method of claim 1, wherein embedding the local security controller comprises:

defining the first set of code for the local security controller in the particular application before the second set of code associated with the function or service.

3. The method of claim 1 further comprising:

converting a first format of the request to a second format of the function or service.

4. The method of claim 1 further comprising:

determining that the request violates the security rule based on the request comprising code in a first language that is different from a second language used to define the function or service.

5. The method of claim 1, wherein performing the protective action further comprises:

preventing the request from calling or invoking the function or service.

6. The method of claim 1, wherein performing the protective action further comprises:

presenting a violation of the security rule in one or more of a log of the particular application or a diagnostic display created during execution of the particular application.

7. The method of claim 1 further comprising:

determining that the request violates the security rule based on data from the request being mismatched with context of the particular application.

8. The method of claim 1 further comprising:

customizing the set of application-specific security rules based on threats or attacks that are specific to the function or service and other functions or services of the particular application.

9. The method of claim 1 further comprising:

forwarding the request from the local security controller to a remote security controller executing on a different device than the particular application; and activating a protection at the local security controller in response to the remote security controller detecting a violation of a particular security rule that is not part of the set of application-specific security rules.

10. The method of claim 9, wherein activating the protection comprises:

enforcing the protection against subsequent requests that arrive after the request and that contain an attack signature that is specified as part of activating the protection.

11. The method of claim 9, wherein activating the protection comprises:

intercepting a second request that arrives after the request; and screening the second request against the set of application-specific security rules and an attack signature that is associated with the protection activated by the remote security controller.

12. The method of claim 1, wherein performing the protective action further comprises:

removing sensitive data from the request before executing the second set of code and calling or invoking the function or service with the request.

13. The method of claim 1, wherein resuming execution of the second set of code comprises:

asynchronously forwarding the request from the local security controller to a remote security controller executing on a different device than the particular application while calling or invoking the function or service of the particular application in response to the request not violating the set of application-specific security rules.

14. The method of claim 1, wherein resuming execution of the second set of code comprises:

forwarding the request from the local security controller to a remote security controller executing on a different device than the particular application; and executing the second set of code in response to the remote security controller verifying that the request does not violate a different second set of rules or the remote security controller not providing a response within a specific amount of time after said forwarding of the request.

15. The method of claim 1, wherein resuming execution of the second set of code comprises:

releasing the request from the secure environment back to the particular application; and providing the request as input to the second set of code.

16. The method of claim 1, wherein generating the secure environment further comprises:

initiating a WebAssembly module within the particular application that analyzes the request using first resources allocated to execution of the first set of code without accessing the second set of code or second resources allocated to execution of the second set of code.

17. A security system comprising:

a first set of code of a local security controller that is embedded in a second set of code of a particular application running on an operating system of a device with other applications that provide a plurality of different functions and services to other requesting devices, wherein the first set of code of the local security controller configures one or more hardware processors of the device to:

intercept a request that is directed to a function or service of the particular application by the local security controller before the second set of code associated with the function or service in the particular application executes;

generate a secure environment within the particular application in response to intercepting the request and based on execution of the first set of code embedded in the particular application, wherein generating the secure environment comprises allocating resources to the secure environment that are not shared with memory or resources previously allocated for execution of the particular application, and wherein the secure environment prevents the request and code or a script included with the request from accessing the memory and the resources that were previously allocated for execution of the particular application;

analyze, within the secure environment, parameters of the request that call or invoke the function or service against a set of application-specific security rules configured in the first set of code, wherein analyzing the parameters of the request comprises:

executing the code or the script that is included with the request using the resources allocated to the secure environment without permitting the code or the script to access the memory or the resources that were previously allocated for execution of the particular application; and determining whether the request violates one or more of the set of application-specific security rules based on malicious activity that is detected from executing the code or the script within the secure environment;

resume execution of the second set of code in response to the request not violating any of the set of application-specific security rules, wherein resuming execution of the second set of code comprises invoking the function or service of the particular application with the request; and perform a protective action that is defined as part of a security rule from the set of application-specific security rules in response to the request violating the security rule, wherein performing the protective action comprises blocking execution of the second set of code.

18. The security system of claim 17, wherein the one or more hardware processors are further configured to:

determine that the request violates the security rule based on the request comprising code in a first language that is different from a second language used to define the function or service.

19. The security system of claim 17, wherein performing the protective action further comprises:

preventing the request from calling or invoking the function or service.

20. A non-transitory computer-readable medium storing instructions that, when executed by one or more processors of a device, cause the device to perform operations comprising:

embedding a first set of code of a local security controller in a second set of code of a particular application, wherein the particular application runs on an operating system of the device with other applications that provide a plurality of different functions and services to other requesting devices;

executing the particular application in response to a request that is directed to a function or service of the particular application, wherein executing the particular application comprises intercepting the request by the local security controller based on the first set of code executing before code from the second set of code associated with the function or service in the particular application is called or executed;

generating a secure environment within the particular application in response to intercepting the request and based on execution of the first set of code embedded in the particular application, wherein generating the secure environment comprises allocating resources to the secure environment that are not shared with memory or resources previously allocated for execution of the particular application, and wherein the secure environment prevents the request and code or a script included with the request from accessing the memory and the resources that were previously allocated for execution of the particular application;

analyzing, within the secure environment, parameters of the request that call or invoke the function or service against a set of application-specific security rules configured in the first set of code, wherein analyzing the parameters of the request comprises:

executing the code or the script that is included with the request using the resources allocated to the secure environment without permitting the code or the script to access the memory or the resources that were previously allocated for execution of the particular application; and determining whether the request violates one or more of the set of application-specific security rules based on malicious activity that is detected from executing the code or the script within the secure environment;

resuming execution of the second set of code in response to the request not violating any of the set of application-specific security rules, wherein resuming execution of the second set of code comprises invoking the function or service of the particular application with the request; and performing a protective action that is defined as part of a security rule from the set of application-specific security rules in response to the request violating the security rule, wherein performing the protective action comprises blocking execution of the second set of code.

* * * * *